US005302439A

United States Patent [19]

Malhotra et al.

[11] Patent Number: 5,302,439

[45] Date of Patent: Apr. 12, 1994

[54] RECORDING SHEETS

[75] Inventors: Shadi L. Malhotra, Mississauga; Brent S. Bryant, Milton, both of Canada

[73] Assignee: Xerox Corporation, Stamford, Conn.

[21] Appl. No.: 33,932

[22] Filed: Mar. 19, 1993

[51] Int. Cl.[5] .................. B32B 9/00

[52] U.S. Cl. .................. 428/195; 428/211; 428/501; 428/511; 428/524; 428/913

[58] Field of Search .................. 428/454, 501, 511, 524, 428/195, 913, 914, 211, 436, 451, 460, 494; 427/150

[56] References Cited

U.S. PATENT DOCUMENTS

| | | | |
|---|---|---|---|
| 3,488,189 | 1/1970 | Mayer et al. | 96/1.5 |
| 3,493,412 | 2/1970 | Johnston et al. | 117/175 |
| 3,561,337 | 2/1971 | Mulkey | 95/1 |
| 3,619,279 | 11/1971 | Johnston et al. | 117/155 UA |
| 3,952,132 | 4/1976 | Kato et al. | 428/341 |
| 4,148,968 | 4/1979 | Nagashima et al. | 428/454 |
| 4,526,847 | 7/1985 | Walker et al. | 430/18 |
| 4,775,594 | 10/1988 | Desjarlais | 428/421 |
| 4,956,225 | 9/1990 | Malhotra | 428/216 |
| 4,997,697 | 3/1991 | Malhotra | 428/195 |
| 5,118,570 | 6/1992 | Malhotra | 428/474.4 |
| 5,145,749 | 9/1992 | Matthew | 428/511 |

FOREIGN PATENT DOCUMENTS 0463400 of 0000 European Pat. Off. .

*Primary Examiner*—Patrick J. Ryan
*Assistant Examiner*—William A. Krynski
*Attorney, Agent, or Firm*—Judith L. Byorick

[57] ABSTRACT

Disclosed is a recording sheet which comprises (a) a substrate; (b) a coating on the substrate which comprises a binder and a material having a melting point of less than about 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional traction agent; and (d) an optional antistatic agent.

32 Claims, No Drawings

RECORDING SHEETS

BACKGROUND OF THE INVENTION

The present invention is directed to coated recording sheets. More specifically, the present invention is directed to recording sheets particularly suitable for use in electrophotographic printing processes. One embodiment of the present invention is directed to a recording sheet which comprises (a) a substrate; (b) a coating on the substrate which comprises a binder and a material having a melting point of less than about 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional traction agent ; and (d) an optional antistatic agent.

U.S. Pat. No. 5,118,570 (Malhotra) and U.S. Pat. No. 5,006,407 (Malhotra), the disclosures of each of which are totally incorporated herein by reference, disclose a transparency which comprises a hydrophilic coating and a plasticizer, which plasticizer can, for example, be from the group consisting of phosphates, substituted phthalic anhydrides, glycerols, glycols, substituted glycerols, pyrrolidinones, alkylene carbonates, sulfolanes, and stearic acid derivatives.

U.S. Pat. No. 5,145,749 (Matthew) discloses erasable coatings for xerography paper which comprise a pigment such as calcium carbonate in a binder such as an aqueous emulsion of an acrylic polymer. The erasability of the coating is improved by replacing at least 15 weight percent of the binder with a polyalkane or polyalkene wax, such as an aqueous emulsion of a polyolefin.

U.S. Pat. No. 4,526,847 (Walker et al.) discloses a transparency for the formation of an adherent electrostatic image thereon which includes a polyester resin film sheet having an image-receiving coating of nitrocellulose, a plasticizer, a particulate material, and, preferably, an antistatic agent. The coating is applied to the film sheet from a solvent mixture of an aliphatic ester or an aliphatic ketone, and an aliphatic alcohol.

U.S. Pat. No. 3,619,279 (Johnston et al.) discloses a toner receiving member having available at an external surface a solid crystalline plasticizer to reduce the fusion power requirements when toner is fused to the receiving member. The external surface of the toner receiving member is substantially free of material plasticizable by the solid crystalline plasticizer. Typically a plasticizer such as ethylene glycol dibenzoate may be available on the surface of paper.

U.S. Pat. No. 3,561,337 (Mulkey) discloses a sheet material having a transparent backing coated with a layer containing a polymeric binder and particles of solid material which is insoluble in the binder. The refractive index of the solid material varies from that of the binder by at most ±0.6. The surface of the layer is ink receptive and, by printing on that surface, a transparency is obtained.

U.S. Pat. No. 3,493,412 (Johnston et al.) discloses an imaging process wherein an electrostatic latent image is developed with a thermoplastic resin toner on an imaging surface and the toner image is transferred to an image receiving surface carrying an amount of a solid crystalline plasticizer sufficient to lower the toner fusion requirements when the toner image is fused to the receiving surface.

U.S. Pat. No. 3,488,189 (Mayer et al.) discloses the formation of fused toner images on an imaging surface corresponding to an electrostatic field by depositing on the imaging surface in image configuration toner particles containing a thermoplastic resin, the imaging surface carrying a solid crystalline plasticizer having a lower melting point than the melting range of the thermoplastic resin and heat fusing the resulting toner image.

U.S. Pat. No. 4,956,225 (Malhotra) discloses a transparency suitable for electrographic and xerographic imaging which comprises a polymeric substrate with a toner receptive coating on one surface thereof comprising blends selected from the group consisting of: poly(ethylene oxide) and carboxymethyl cellulose; poly(ethylene oxide), carboxymethyl cellulose, and hydroxypropyl cellulose; poly(ethylene oxide) and vinylidene fluoride/hexafluoropropylene copolymer; poly(chloroprene) and poly(alpha-methylstyrene); poly(caprolactone) and poly(alphamethylstyrene); poly(vinyl isobutyl ether) and poly(alpha-methylstyrene); poly(caprolactone) and poly(p-isopropyl alpha-methylstyrene); blends of poly(1,4-butylene adipate) and poly(alpha-methylstyrene); chlorinated poly(propylene) and poly(alpha-methylstyrene); chlorinated poly(ethylene) and poly(alpha-methylstyrene); and chlorinated rubber and poly(alphamethylstyrene). Also disclosed are transparencies with first and second coating layers.

U.S. Pat. No. 4,997,697 (Malhotra) discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters, or mixtures thereof, and wherein the toner receiving layer contains adhesive components.

European Patent Publication 463,400, published Jan. 2, 1992, corresponding to copending application U.S. Ser. No. 07/544,577 (Malhotra), entitled "Transparencies Comprising Metal Halide or Urea Antistatic Layer," discloses a transparent substrate material for receiving or containing an image comprising a supporting substrate, an ink toner receiving coating composition on both sides of the substrate and comprising an adhesive layer and an antistatic layer contained on two surfaces of the adhesive layer, which antistatic layer comprises mixtures or complexes of metal halides or urea compounds both with polymers containing oxyalkylene segments.

Copending application U.S. Ser. No. 07/806,064 (Malhotra et al.), entitled "Coated Recording Sheets for Electrostatic Printing Processes," discloses a recording sheet which comprises a base sheet, an antistatic layer coated on at least one surface of the base sheet comprising a mixture of a first component selected from the group consisting of hydrophilic polysaccharides and a second component selected from the group consisting of poly (vinyl amines), poly (vinyl phosphates), poly (vinyl alcohols), poly (vinyl alcohol)-ethoxylated, poly (ethylene imine)ethoxylated, poly (ethylene oxides), poly (n-vinyl acetamide-vinyl sulfonate salts), melamine-formaldehyde resins, urea-formaldehyde resins, styrenevinylpyrrolidone copolymers, and mixtures thereof, and at least one toner receiving layer coated on an antistatic layer comprising a material selected from the group consisting of maleic anhydride containing polymers, maleic ester containing polymers, and mixtures thereof.

While the above materials and processes are suitable for their intended purposes, a need remains for recording sheets particularly suitable for use in electrophotographic applications. In addition, a need remains for recording sheets upon which the toner materials commonly employed in electrophotographic Imaging processes exhibit improved adhesion. Further, there is a need for recording sheets exhibiting improved toner adhesion wherein the additive components in the coating on the recording sheet which enable the improved adhesion remain within the coating when the recording sheet is stored in a vinyl or plastic folder.

SUMMARY OF THE INVENTION

It is an object of the present invention to provide a recording sheet with the above advantages.

It is another object of the present invention to provide recording sheets particularly suitable for use in electrophotographic applications.

It is yet another object of the present invention to provide recording sheets upon which the toner materials commonly employed in electrophotographic imaging processes exhibit improved adhesion.

It is still another object of the present invention to provide recording sheets exhibiting improved toner adhesion wherein the additive components in the coating on the recording sheet which enable the improved adhesion remain within the coating when the recording sheet is stored in a vinyl or plastic folder.

These and other objects of the present invention (or specific embodiments thereof) can be achieved by providing a recording sheet which comprises (a) a substrate; (b) a coating on the substrate which comprises a binder and a material having a melting point of less than about 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional traction agent; and (d) an optional antistatic agent.

DETAILED DESCRIPTION OF THE INVENTION

The recording sheets of the present invention comprise a substrate or base sheet having a coating on one or both surfaces thereof. Any suitable substrate can be employed. Examples of substantially transparent substrate materials include polyesters, including Mylar TM, available from E. I. Du Pont de Nemours & Company, Melinex TM, available from Imperial Chemicals, Inc., Celanar TM, available from Celanese Corporation, polycarbonates such as Lexan TM, available from General Electric Company, polysulfones,such as those available from Union Carbide Corporation, polyethersulfones, such as those prepared from 4,4'-diphenyl ether, such as Udel TM, available from Union Carbide Corporation, those prepared from disulfonyl chloride, such as Victrex TM, available from ICI Americas Incorporated, those prepared from biphenylene, such as Astrel TM, available from 3M Company, poly (arylene sulfones), such as those prepared from crosslinked poly(arylene ether ketone sulfones), cellulose triacetate, polyvinylchloride cellophane, polyvinyl fluoride, polyamides, and the like, with polyester such as Mylar TM being preferred in view of its availability and relatively low cost. The substrate can also be opaque, including opaque plastics, such as Teslin TM, available from PPG Industries, and filled polymers, such as Melinex ®, available from ICI. Filled plastics can also be employed as the substrate, particularly when it is desired to make a "never-tear paper" recording sheet. Paper is also suitable, including plain papers such as Xerox ® 4024, diazo papers, or the like.

In one embodiment of the present invention, the substrate comprises sized blends of hardwood kraft and softwood kraft fibers containing from about 10 to 90 percent by weight soft wood and from about 10 to about 90 percent by weight hardwood. Examples of hardwood include Seagull W dry bleached hardwood kraft, present in one embodiment in an amount of about 70 percent by weight. Examples of softwood include La Tuque dry bleached softwood kraft, present in one embodiment in an amount of about 30 percent by weight. These substrates can also contain fillers and pigments in any effective amounts, typically from about 1 to about 60 percent by weight, such as clay (available from Georgia Kaolin Company, Astro-fil 90 clay, Engelhard Ansilexclay),titanium dioxide (available from Tioxide Company - Anatase grade AHR), calcium silicate CH-427-97-8, XP-974 (J. M. Huber Corporation), and the like. The sized substrates can also contain sizing chemicals in any effective amount, typically from about 0.25 percent to about 25 percent by weight of pulp, such as acidic sizing, including Mon size (available from Monsanto Company), alkaline sizing such as Hercon-76 (available from Hercules Company), Alum (available from Allied Chemicals as iron free alum), retention aid (available from Allied Colloids as Percol 292), and the like. The preferred internal sizing degree of papers selected for the present invention, including commercially available papers, varies from about 0.4 to about 5,000 seconds, and papers in the sizing range of from about 0.4 to about 300 seconds are more preferred, primarily to decrease costs. Preferably, the selected substrate is porous, and the porosity value of the selected substrate preferably varies from about 100 to about 1,260 milliliters per minute and preferably from about 50 to about 600 milliliters per minute to enhance the effectiveness of the recording sheet in ink jet processes. Preferred basis weights for the substrate are from about 40 to about 400 grams per square meter, although the basis weight can be outside of this range.

Illustrative examples of commercially available internally and externally (surface) sized substrates suitable for the present invention include Diazo papers, offset papers, such as Great Lakes offset, recycled papers, such as Conservatree, office papers, such as Automimeo, Eddy liquid toner paper and copy papers available from companies such as Nekoosa, Champion, Wiggins Teape, Kymmene, Modo, Domtar, Veltsiluoto and Sanyo, and the like, with Xerox ® 4024 TM papers and sized calcium silicate-clay filled papers being particularly preferred in view of their availability, reliability, and low print through. Pigmented filled plastics, such as Teslin (available from PPG industries), are also preferred as supporting substrates.

The substrate can be of any effective thickness. Typical thicknesses for the substrate are from about 50 to about 500 microns, and preferably from about 100 to about 125 microns, although the thickness can be outside these ranges.

Coated on one or both surfaces of the base sheet is a coating. This coating can be either coated directly onto the base sheet or coated onto another layer of material coated onto the base sheet previously, such as an antistatic layer, an anticurl layer, or the like. This coating comprises a binder and a material having a melting point of less than about 65° C. and a boiling point of greater than 150° C. Any suitable polymeric binder can be employed. Examples of suitable binder polymers include (a) hydrophilic polysaccharides and their modifications, such as (1) starch (such as starch SLS-280, available from St. Lawrence starch), (2) cationic starch (such as Cato-72, available from National Starch), (3) hydroxyalkyl starch, wherein alkyl has at least one carbon atom and wherein the number of carbon atoms is such that the material is water soluble, preferably from about 1 to about 20 carbon atoms, and more preferably from about 1 to about 10 carbon atoms, such as methyl, ethyl, propyl, butyl, or the like (such as hydroxypropyl starch (#02382, available from Poly Sciences Inc.) and hydroxyethyl starch (#06733, available from Poly Sciences Inc.)), (4) gelatin (such as Calfskin gelatin #00639, available from Poly Sciences Inc.), (5) alkyl celluloses and aryl celluloses, wherein alkyl has at least one carbon atom and wherein the number of carbon atoms is such that the material is water soluble, preferably from 1 to about 20 carbon atoms, more preferably from 1 to about 10 carbon atoms, and even more preferably from 1 to about 7 carbon atoms, such as methyl, ethyl, propyl, butyl, pentyl, hexyl, benzyl, and the like (such as methyl cellulose (Methocel AM 4, available from Dow Chemical Company)), and wherein aryl has at least 6 carbon atoms and wherein the number of carbon atoms is such that the material is water soluble, preferably from 6 to about 20 carbon atoms, more preferably from 6 to about 10 carbon atoms, and even more preferably about 6 carbon atoms, such as phenyl, (6) hydroxy alkyl celluloses, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as hydroxyethyl cellulose (Natrosol 250 LR, available from Hercules Chemical Company), and hydroxypropyl cellulose (Klucel Type E, available from Hercules Chemical Company)), (7) alkyl hydroxy alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, benzyl, or the like (such as ethyl hydroxyethyl cellulose (Bermocoll, available from Berol Kem. A.B. Sweden)), (8) hydroxy alkyl alkyl celluloses, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxyethyl methyl cellulose (HEM, available from British Celanese Ltd., also available as Tylose MH, MHK from Kalle A. G.), hydroxypropyl methyl cellulose (Methocel K35LV, available from Dow Chemical Company), and hydroxy butylmethyl cellulose (such as HBMC, available from Dow Chemical Company)), (9) dihydroxyalkyl cellulose, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dihydroxypropyl cellulose, which can be prepared by the reaction of 3-chloro-1,2-propane with alkali cellulose), (10) hydroxy alkyl hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as hydroxypropyl hydroxyethyl cellulose, available from Aqualon Company), (11) halodeoxycellulose, wherein halo represents a halogen atom (such as chlorodeoxycellulose, which can be prepared by the reaction of cellulose with sulfuryl chloride in pyridine at 25° C.), (12) amino deoxycellulose (which can be prepared by the reaction of chlorodeoxy cellulose with 19 percent alcoholic solution of ammonia for 6 hours at 160° C.), (13) dialkylammonium halide hydroxy alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as Celquat H-diethylammonium chloride hydroxy ethyl cellulose, available as Celquat H-100, L-200, National Starch and Chemical Company), (14) hydroxyalkyl trialkyl ammonium halide hydroxyalkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein halide represents a halogen atom (such as hydroxypropyl trimethyl ammonium chloride hydroxyethyl cellulose, available from Union Carbide Company as Polymer JR), (15) dialkyl amino alkyl cellulose, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, (such as diethyl amino ethyl cellulose, available from Poly Sciences Inc. as DEAE cellulose #05178), (16) carboxyalkyl dextrans, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, pentyl, hexyl, and the like, (such as carboxymethyl dextrans, available from Poly Sciences Inc. as #16058), (17) dialkyl aminoalkyl dextran, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as diethyl aminoethyl dextran, available from Poly Sciences Inc. as #5178), (18) amino dextran (available from Molecular Probes Inc), (19) carboxy alkyl cellulose salts, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethyl cellulose CMC 7HOF, available from Hercules Chemical Company), (20) gum arabic (such as #G9752, available from Sigma Chemical Company), (21) carrageenan (such as #C1013 available from Sigma Chemical Company), (22) Karaya gum (such as #G0503, available from Sigma Chemical Company), (23) xanthan (such as Keltrol-T, available from Kelco division of Merck and Company), (24) chitosan (such as #C3646, available from Sigma Chemical Company), (25) carboxyalkyl hydroxyalkyl guar, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as carboxymethyl hydroxypropyl guar, available from Auqualon Company), (26) cationic guar (such as Celanese Jaguars C-14-S, C-15, C-17, available from Celanese Chemical Company), (27) n-carboxyalkyl chitin, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, such as n-carboxymethyl chitin, (28) dialkyl ammonium hydrolyzed collagen protein, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like (such as dimethyl ammonium hydrolyzed collagen protein, available from Croda as Croquats), (29) agar-agar (such as that available from Pfaltz and Bauer Inc), (30) cellulose sulfate salts, wherein the cation is any conventional cation, such as sodium, lithium, potassium, calcium, magnesium, or the like (such as sodium cellulose sulfate #023 available from Scientific Polymer Products), and (31) carboxyalkylhydroxyalkyl cellulose salts, wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl and the like, and wherein the cation is any conventional cation, such as sodium, lithium, potassium, calcium, magnesium, or the like (such as sodium carboxymethylhydroxyethyl cellulose CMHEC 43H and 37L available from Hercules Chemical Company); (b) vinyl polymers, such as (1) poly(vinyl alcohol) (such as Elvanol available from Dupont Chemical Company), (2) poly (vinyl phosphate) (such as #4391 available from Poly Sciences Inc.), (3) poly (vinyl pyrrolidone) (such as that available from GAF Corporation), (4) vinyl pyrrolidone-vinyl acetate copolymers (such as #02587, available from Poly Sciences Inc.), (5) vinyl pyrrolidone-styrene copolymers (such as #371, available from Scientific Polymer Products), (6) poly (vinylamine) (such as #1562, available from Poly Sciences Inc.), (7) poly (vinyl alcohol) alkoxylated, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl alcohol) ethoxylated #6573, available from Poly Sciences Inc.), and (8) poly (vinyl pyrrolidone-dialkylaminoalkyl alkylacrylate), wherein each alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as poly (vinyl pyrrolidone-diethylaminomethylmethacrylate) #16294 and #16295, available from Poly Sciences Inc.); (c) formaldehyde resins, such as (1) melamine-formaldehyde resin (such as BC 309, available from British Industrial Plastics Limited), (2) urea-formaldehyde resin (such as BC777, available from British industrial Plastics Limited), and (3) alkylated urea-formaldehyde resins, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as methylated urea-formaldehyde resins, available from American Cyanamid Company as Beetle 65); (d) ionic polymers, such as (1) poly (2-acrylamide-2-methyl propane sulfonic acid) (such as #175 available from Scientific Polymer Products), (2) poly (N,N-dimethyl-3,5-dimethylene piperidinium chloride) (such as #401, available from Scientific Polymer Products), and (3) poly (methyleneguanidine) hydrochloride (such as #654, available from Scientific Polymer Products); (e) latex polymers, such as (1) cationic, anionic, and nonionic styrene-butadiene latexes (such as that available from Gen Corp Polymer Products, such as RES 4040 and RES 4100, available from Unocal Chemicals, and such as DL 6672A, DL6638A, and DL6663A, available from Dow Chemical Company), (2) ethylenevinylacetate latex (such as Airflex 400, available from Air Products and Chemicals Inc.), (3) vinyl acetate-acrylic copolymer latexes (such as synthemul 97-726, available from Reichhold Chemical Inc, Resyn 25-1110 and Resyn 25-1140, available from National Starch Company, and RES 3103 available from Unocal Chemicals, and (4) polyester latex, such as Eastman AQ 29D, available from Eastman Chemicals; (f) maleic anhydride and maleic acid containing polymers, such as (1) styrene-maleic anhydride copolymers (such as that available as Scripset from Monsanto, and the SMA series available from Arco), (2) vinyl alkyl ether-maleic anhydride copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinyl methyl ethermaleic anhydride copolymer #173, available from Scientific Polymer Products), (3) alkylene-maleic anhydride copolymers, wherein alkylene has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as ethylene-maleic anhydride copolymer #2308, available from Poly Sciences Inc., also available as EMA from Monsanto Chemical Company), (4) butadiene-maleic acid copolymers (such as #07787, available from Poly Sciences Inc.), (5) vinylalkylethermaleic acid copolymers, wherein alkyl has at least one carbon atom and wherein the number of carbon atoms is such that the material is water soluble, preferably from 1 to about 20 carbon atoms, more preferably from 1 to about 10 carbon atoms, such as methyl, ethyl, propyl, butyl, and the like (such as vinylmethylether-maleic acid copolymer, available from GAF Corporationas Gantrez S-95), and (6) alkyl vinyl ether-maleic acid esters, wherein alkyl has at least one carbon atom and where the number of carbon atoms is such that the material is water soluble, preferably from 1 to about 20 carbon atoms, more preferably from 1 to about 10 carbon atoms, such as methyl, ethyl, propyl, butyl, and the like (such as methyl vinyl ether maleic acid ester #773, available from Scientific Polymer Products); (g) acrylamide containing polymers, such as (1) poly (acrylamide) (such as #02806, available from Poly Sciences Inc.), (2) acrylamide-acrylic acid copolymers (such as #04652, #02220, and #18545, available from Poly Sciences Inc.), and (3) poly (N,N-dimethyl acrylamide) (such as #004590, available from Poly Sciences Inc.), (h) poly (alkylene imine) containing polymers, wherein alkylene has two (ethylene), three (propylene), or four (butylene) carbon atoms, such as (1) poly(ethylene imine) (such as #135, available from Scientific Polymer Products), (2) poly(ethylene imine) epichlorohydrin (such as #634, available from Scientific Polymer Products), and (3) alkoxylated poly (ethylene imine), wherein alkyl has one (methoxylated), two (ethoxylated), three (propoxylated), or four (butoxylated) carbon atoms (such as ethoxylated poly (ethylene imine #636, available from Scientific Polymer Products); and (i) styrene homopolymers and copolymers, such as (1) polystyrene (such as C#400, available from Scientific Polymer Products), (2) styrene-butadiene resins (available from Scientific Polymer Products), and (3) styrene-n-butylmethacrylate resins (available from Scientific Polymer Products); (j) alcohol soluble polymers, such as those polymers soluble in methanol, including polyacrylic acid, such as #598, #599, #600, #413, available from Scientific Polymer Products, poly (hydroxyalkyl methacrylates), wherein alkyl has from 1 to about 18 carbon atoms, including methyl, ethyl, propyl, butyl, hexadecyl, and the like, including poly(2-hydroxyethylmethacrylate), such as #414, #815, available from Scientific Polymer Products, and poly(hydroxypropylmethacrate), such as #232 available from Scientific Polymer Products, poly (hydroxyalkylacrylates), wherein alkyl is methyl, ethyl, or propyl, including poly(2-hydroxyethyl acrylate), such as #850, available from Scientific Polymer Products, and poly(hydroxypropyl acrylate), such as #851, available from Scientific Polymer Products, poly(vinyl butyral), such as #043, #511, #507, available from Scientific Polymer Products, alkyl cellulose or aryl cellulose, wherein alkyl is methyl, ethyl, propyl, or butyl and aryl is phenyl or the like, including ethyl cellulose such as Ethocel N-22, available from Hercules Chemical Company, poly (vinylacetate), such as #346, #347, available from Scientific Polymer Products, and the like; (k) ketone soluble polymers, such as those polymers soluble in acetone, including hydroxyalkyl cellulose acrylates and hydroxyaryl cellulose acrylates, wherein alkyl is methyl, ethyl, propyl, or butyl and aryl is phenyl or the like, including hydroxyethyl cellulose acrylate, such as #8630, available from Monomer-Polymer and Dajac Laboratories Inc., hydroxyalkyl cellulose methacrylates and hydroxyaryl cellulose methacrylates, wherein alkyl is methyl, ethyl, propyl, or butyl and aryl is phenyl or the like, including hydroxyethyl cellulose methacrylate, such as #8631, available from Monomer-Polymer and Dajac Laboratories Inc., cellulose-acrylamide adducts, such as #8959, #8960, #8961, #8962, available from Monomer-Polymer and Dajac Laboratories, Inc., poly (vinyl butyral), such as #043, #511, #507, available from Scientific Polymer Products, cyanoethylated cellulose, such as #091, available from Scientific Polymer Products, cellulose acetate hydrogen phthalate, such as #085, available from Scientific Polymer Products, hydroxypropylmethyl cellulose phthalate, such as HPMCP, available from Shin-Etsu Chemical, cellulose triacetate, such as #031, available from Scientific Polymer Products, poly ($\alpha$-methylstyrene), such as #309, available from Scientific Polymer Products, styrene-butadiene copolymers, such as Kraton G-1652, Kraton DX-1 1 50, and Kraton elastomer (such as D1107, G-1657, G-1657/FG1901, D-1 101, FG1901, available from Shell Corporation), styrene-butylmethacrylate copolymers, such as #595, available from Scientific Polymer Products, vinyl chloride-vinylacetate-vinyl alcohol terpolymers, such as #428, available from Scientific Polymer Products, (l) chlorinated solvent soluble polymers, such as poly (p-phenylene ether-sulfone) (such as #392, available from Scientific Polymer Products), polysulfones, such as #046, available from Scientific 9306, APE KLI-9310, available from Dow Chemical Company, poly carbonates, such as #035, available from Scientific Polymer Products, $\alpha$-methylstyrene-dimethylsiloxane block copolymers, such as PS 0965, available from Petrarch Systems, dimethyl siloxane-bisphenol A carbonate block copolymers, such as PS099, available from Petrarch Systems, poly (2,6-dimethyl p-phenylene oxide), such as #126, available from Scientific Polymer Products, poly (2,4,6-tribromostyrene), such as #166, available from Scientific Polymer Products; and the like, as well as blends or mixtures of any of the above, with starches and latexes being particularly preferred because of their availability and applicability to paper. Also particularly preferred are styrene-butadiene resins, styrene-n-butylmethacrylate resins, and polyesters such as polyester latex AQ from Eastman Chemicals. Any mixtures of the above ingredients in any relative amounts can be employed.

The coating on the base sheet or substrate also contains an additive material having a melting point of less than about 65° C. and a boiling point of greater than 150° C. and selected from the group consisting of alkyl phenones, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof.

Examples of suitable additive materials include alkyl phenones, such as those of the formula $C_6H_5CO(CH_2)_nCH_3$ wherein n is a number of from about 5 to about 16, including (1) octanophenone $C_6H_5CO(CH_2)_6CH_3$ (Aldrich 31,977-5); (2) decanophenone $C_6H_5CO(CH_2)_8CH_3$ (Aldrich 31,128-6); (3) dodecanophenone $C_6H_5CO(CH_2)_{10}CH_3$ (Aldrich 25,271-9); (4) tetradecanophenone $C_6H_5CO(CH_2)_{12}CH_3$ (Aldrich 31,978-3); (5) hexadecanophenone $C_6H_5CO(CH_2)_{14}CH_3$ (Aldrich 31,978-3); (6) octadecanophenone $C_6H_5CO(CH_2)_{16}CH_3$ (Aldrich 31,841-8); and the like.

Also suitable are alkyl ketones, such as those of the formula $CH_3(CH_2)_mCO(CH_2)_nCH_3$ wherein m and n are each numbers of from about 4 to about 8, including (1) 6-undecanone $CH_3(CH_2)_4CO(CH_2)_4CH_3$ (Aldrich 13,699-9); (2) 8-pentadecanone $CH_3(CH_2)_6CO(CH_2)_6CH_3$ (Aldrich 15,838-0); (3) 9-heptadecanone $CH_3(CH_2)_7CO(CH_2)_7CH_3$ (Aldrich 10,294-6); (4) 10-nonadecanone $CH_3(CH_2)_8CO(CH_2)_8CH_3$ (Aldrich 10,366-7); and the like.

Also suitable are halogenated alkanes, such as mono-halogenated alkanes of the formula $CH_3(CH_2)_nX$ wherein X is a halogen atom, such as fluorine, chlorine, bromine, iodine, or the like, and n is a number of from about 15 to about 25, including(1) 1-bromooctadecane $CH_3(CH_2)_{17}Br$ (Aldrich 19,949-4); (2) 1-bromodocosane $CH_3(CH_2)_{20}Br$ (Aldrich33,294-1);and the like, di-halogenated alkanes, such as those of the formula $X(CH_2)_nX$, wherein X is a halogen atom and n is a number of from about 6 to about 15, such as (3) 1,6-dlbromohexane $Br(CH_2)_6Br$ (Aldrich D4, 100-7); (4) 1,7-dibromoheptane $Br(CH_2)_7Br$ (Aldrich 14, 499-1); (5) 1,8-dibromooctane $Br(CH_2)_8Br$ (Aldrich D4,260-7); (6) 1,10-dibromodecane $Br(CH_2)_{10}Br$ (Aldrich D3980-0); (7) 1,10-dichlorodecane $Cl(CH_2)_{10}Cl$ (Aldrich 25,478-9); (8) 1,12-dibromododecane $Br(CH_2)_{12}Br$ (Aldrich 25,478-9); (9) 1,12-dibromododecane $Br(CH_2)_{12}Br$ (Aldrich 13,338-8); and the like.

Also suitable are alkyl amines, such as those of the formula $CH_3(CH_2)_nNH_2$, wherein n is a number of from about 6 to about 20, including (1) heptyl amine $CH_3(CH_2)_6NH_2$ (Aldrich 12,680-2); (2) octyl amine $CH_3(CH_2)_7NH_2$ (Aldrich 0-580-2); (3) decyl amine $CH_3(CH_2)_9NH_2$ (Aldrich D240-4); (4) undecyl amine $CH_3(CH_2)_{10}NH_2$ (Aldrich U 140-0); (5) dodecyl amine $CH_3(CH_2)_{11}NH_2$ (Aldrich 32,516-3); (6) tridecyl amine $CH_3(CH_2)_{12}NH_2$ (Aldrich T5,800-9); (7) tetradecyl amine $CH_3(CH_2)_{13}NH_2$ (Aldrich T1,0006); (8) hexadecyl amine $CH_3(CH_2)_{15}NH_2$ (Aldrich H740-8); (9) octadecyl amine $CH_3(CH_2)_{15}NH_2$ (Aldrich 30,539-1); and the like.

Also suitable are alkyl anilines, such as those of the formula $CH_3(CH_2)_nC_6H_4NH_2$, wherein n is a number of from about 6 to about 20, including (1) heptyl aniline $CH_3(CH_2)_6C_6H_4NH_2$ (Aldrich 30,507-3); (2) octyl aniline $CH_3(CH_2)_7C_6H_4NH_2$ (Aldrich 23,352-8); (3) 4-decyl aniline $CH_3(CH_2)_9C_6H_4NH_2$ (Aldrich 23,353-6); (4) 4-tetradecyl aniline $CH_3(CH_2)_{13}C_6H_4NH_2$ (Aldrich 23,355-2); (5) hexadecyl aniline $CH_3(CH_2)_{15}C_6H_4NH_2$ (Aldrich 23,356-0); and the like.

Also suitable are alkyl diamines, such as those of the formula $NH_2(CH_2)_nNH_2$, wherein n is a number of from about 6 to about 10, including (1) 1,6-diaminohexane $NH_2(CH_2)_6NH_2$ (Aldrich H1,169-6); (2) 1,8-diaminooctane $NH_2(CH_2)_8NH_2$ (Aldrich D2, 240-1); (3) 1,9-diaminononane $NH_2(CH_2)_9NH_2$ (Aldrich 18712-7); (4) 1,10-diaminododecane $NH_2(CH_2)_{10}NH_2$ (Aldrich D1420-4); and the like.

Also suitable are alkyl alcohols, such as those of the formula $CH_3(CH_2)_nOH$, wherein n is a number of from about 5 to about 21, including (1) hexyl alcohol $CH_3(CH_2)_5OH$ (Aldrich H1330-3); (2) heptyl alcohol $CH_3(CH_2)_6OH$ (Aldrich H280-5); (3) octyl alcohol $CH_3(CH_2)_7OH$ (Aldrich 29,324-5); (4) nonyl alcohol $CH_3(CH_2)_8OH$ (Aldrich 13,121-0); (5) decyl alcohol $CH_3(CH_2)_9OH$ (Aldrich 23,976-3); (6) undecyl alcohol $CH_3(CH_2)_{10}OH$ (Aldrich U 100-1); (7) 1-dodecanol $CH_3(CH_2)_{11}OH$ (Aldrich 12,679-9); (8) 1-tetradecanol $CH_3(CH_2)_{13}OH$ (Aldrich 18,538-8); (9) 1-pentadecanol $CH_3(CH_2)_{14}OH$ (Aldrich P380-5); (10) 1-hexadecanol $CH_3(CH_2)_{15}OH$ (Aldrich 25,874-1); (11) 1-elcosanol $CH_3(CH_2)_{19}OH$ (Aldrich 23,449-4); (12) 1-docosanol $CH_3(CH_2)_{21}OH$ (Aldrich 16,910-2); and the like.

Also suitable are alkyl diols, such as those of the formula $OH(CH_2)_nOH$, wherein n is a number of from about 5 to about 9, including (1) 1,5-pentane diol $OH(CH_2)_5OH$ (Aldrich P770-3); (2) 1,6-hexane diol $OH(CH_2)_6OH$ (Aldrich H, 1180-7); (3) 1,7-heptane diol $OH(CH_2)_7OH$ (Aldrich H220-1); (4) 1,8-octane diol $OH(CH_2)_8OH$ (Aldrich 0-330-3); (5) 1,9-nonane diol $OH(CH_2)_9OH$ (Aldrich N2,960-0); and the like; and those of the formula $CH_3(CH_2)_nCHOH\ CH_2OH$, wherein n is a number of from about 5 to about 9, including (6) 1,2-octane diol $CH_3(CH_2)_5CHOHCH_2OH$ (Aldrich 21,370-5); (7) 1,2-decane diol $CH_3(CH_2)_7CHOHCH_2OH$ (Aldrich 26,032-0); (8) 1,2-tetradecane diol $CH_3(CH_2)_{11}CHOHCH_2OH$ (Aldrich 26,029-0); and the like.

Also suitable are halogenated alkyl alcohols, such as those of the formula $X(CH_2)_nOH$, wherein n is a number of from about 7 to about 14, including (1) 11-bromo-1-undecanol $Br(CH_2)_{11}OH$ (Aldrich 18413-6); (2) 12-bromo-1-dodecanol $Br(CH_2)_{12}OH$ (Aldrich 22,467-7); and the like.

Also suitable are alkane alkyl esters, such as those of the formula $CH_3(CH_2)_nCOOCH_3$, wherein n is a number of from about 5 to about 23, including (1) methyl heptanoate $CH_3(CH_2)_5COOCH_3$ (Aldrich 14,900-4); (2) methyl nonanoate $CH_3(CH_2)_7COOCH_3$ (Aldrich 24589-5); (3) methyl decanoate $CH_3(CH_2)_8COOCH_3$ (Aldrich 29,903-0); (4) methyl dodecanoate $CH_3(CH_2)_{10}COOCH_3$ (Aldrich 23,459-1); (5) methyl tridecanoate $CH_3(CH_2)_{11}COOCH_3$ (Aldrich M8,540-9); (6) methyl palmitate $CH_3(CH_2)_{14}COOCH_3$ (Aldrich 26,065-7), (7) methyl heptadecanoate $CH_3(CH_2)_{15}COOCH_3$ (Aldrich 28,607-9); (8) methyl stearate $CH_3(CH_2)_{16}COOCH_3$ (Aldrich M7,070-9) (9) methyl nonadecanoate $CH_3(CH_2)_{17}COOCH_3$ (Aldrich 28,683-4); (10) methyl eicosanoate $CH_3(CH_2)_{18}COOCH_3$ (Aldrich 25,220-0); (11) methyl heneicosanoate $CH_3(CH_2)_{19}COOCH_3$ (Aldrich 29,904-9); (12) methyl docosanoate $CH_3(CH_2)_{20}COOCH_3$ (Aldrich 85,527-8); (13) methyl tricosanoate $CH_3(CH_2)_{21}COOCH_3$ (Aldrich 28,734-2); (14) methyl tetracosanoate $CH_3(CH_2)_{22}COOCH_3$ (Aldrich 29,905-7); and the like; and those of the formula $CH_3(CH_2)_n\ COOC_2H_5$, wherein n is a number of from about 4 to about 28, including (15) ethyl hexanoate $CH_3(CH_2)_4COOC_2H_5$ (Aldrich 14,896-2); (16) ethyl octanoate $CH_3(CH_2)_6COOC_2H_5$ (Aldrich 11,232-1); (17) ethyl decanoate $CH_3(CH_2)_8COOC_2H_5$ (Aldrich 14,897-0); (18) ethyl tetradecanoate $CH_3(CH_2)_{12}COOC_2H_5$ (Aldrich E3,960-0); (19) ethyl palmitate $CH_3(CH_2)_{14}COOC_2H_5$ (Aldrich 28,691-5); (20) ethyl stearate $CH_3(CH_2)_{16}COOC_2H_5$ (Aldrich 22,317-4); (21) ethyl triacontanoate $CH_3(CH_2)_{28}COOC_2H_5$ (Aldrich 25,751-6); and the like.

Also suitable are saturated fatty acids, such as those of the formula $CH_3(CH_2)_nCOOH$, wherein n is a number of from about 4 to about 16, including (1) hexanoic acid $CH_3(CH_2)_4COOH$ (Aldrich H1,2 13-7); (2) octanoic acid $CH_3(CH_2)_6COOH$ (Aldrich 15,375-3); (3) nonanoic acid $CH_3(CH_2)_7COOH$ (Aldrich 24,868-1); (4) decanoic acid $CH_3(CH_2)_8COOH$ (Aldrich D165-3); (5) undecanoic acid $CH_3(CH_2)_9COOH$ (Aldrich 17,147-6); (6) lauric acid $CH_3(CH_2)_{10}COOH$ (Aldrich 15,378-8); (7) tridecanoic acid $CH_3(CH_2)_{11}COOH$ (Aldrich T5,760-6); (8) myristic acid $CH_3(CH_2)_{12}COOH$ (Aldrich 15,379-6); (9) pentadecanoic acid $CH_3(CH_2)_{13}COOH$ (Aldrich P360-0); (10) palmitic acid $CH_3(CH_2)_{14}COOH$ (Aldrich 25,872-5); (11) heptadecanoicac[d$CH_3(CH_2)_{15}COOH$(Aldrich $H_{100}$-0); and the like.

Also suitable are unsaturated fatty acids, such as those of the formula $CH_3(CH_2)_7CH{=}(CH_2)_nCOOH$, wherein n is a number of from about 7 to about 13, including (1) elgidic acid $CH_3(CH_2)_7CH{=}(CH_2)_7COOH$ (Aldrich E30-4); (2) erucic acid $CH_3(CH_2)_7CH{=}(CH_2)_{11}COOH$ (Aldrich 85,843-9); (3) nervonic acid $CH_3(CH_2)_7CH{=}(CH_2)_{13}COOH$; and the like.

Also suitable are alkyl aldehydes, such as those of the formula $CH_3(CH_2)_nCHO$, wherein n is a number of from about 8 to about 14, including tetradecyl aldehyde $CH_3(CH_2)_{12}CHO$ (Aldrich T1000-6) and the like.

Also suitable are alkyl anhydrides, such as those of the formula $(CH_3(CH_2)_nCO)_2O$, wherein n is a number of from about 8 to about 14, including (1) lauric anhydride $(CH_3(CH_2)_{10}CO)_2O$ (Aldrich 28, 648-6); (2) palmitic anhydride (Aldrich 28650-8) $(CH_3(CH_2)_{12}CO)_{20}$; and the like.

Also suitable are alkanes, such as those of the formula $CH_3(CH_2)_nCH_3$, wherein n is a number of from about 8 to about 28, including (1) decane $CH_3(CH_2)_8CH_3$ (Aldrich D90-1); (2) dodecane $CH_3(CH_2)_{10}$ $CH_3$ (Aldrich 29,787-9); (3) heptadecane $CH_3(CH_2)_{15}CH_3$ (Aldrich 12,850-3); (4) octadecane $CH_3(CH_2)_{16}CH_3$ (Aldrich 0-65-2); (5) nonadecane $CH_3(CH_2)_{17}CH_3$ (Aldrich N2890-6); (6) eicosane $CH_3(CH_2)_{18}CH_3$ (Aldrich 21,927-4); (7) heneicosane $CH_3(CH_2)_{19}CH_3$ (Aldrich 28,605-2); (8) docosane $CH_3(CH_2)_{20}CH_3$ (Aldrich 13,445-7); (9) tricosane $CH_3(CH_2)_{21}CH_3$ (Aldrich 26,385-0); (10) tetracosane $CH_3(CH_2)_{22}CH_3$ (Aldrich T875-2); (11) pentacosane $CH_3(CH_2)_{23}CH_3$ (Aldrich 28,693-1); (12) heptacosane $CH_3(CH_2)_{25}CH_3$ (Aldrich 28,606-0); (13) octacosane $CH_3(CH_2)_{26}CH_3$ (Aldrich 0-50-4); (14) tricontane $CH_3(CH_2)_{28}CH_3$ (Aldrich 26,384-2); and the like.

Mixtures of any two or more of the above additive materials can also be employed.

The binder can be present within the coating in any effective amount; typically the binder and the additive material are present in relative amounts of from about 10 percent by weight binder and about 90 percent by weight additive material to about 90 percent by weight binder and about 10 percent by weight additive material, although the relative amounts can be outside of this range.

In addition, the coating of the recording sheets of the present invention can contain optional filler components. Fillers can be present in any effective amount provided that the substantial transparency of the recording sheet is maintained, and if present, typically are present in amounts of from about 0.5 to about 5.0 percent by weight of the coating composition. Examples of filler components include colloidal silicas, such as Syloid 74, available from Grace Company, titanium dioxide (available as Rutile or Anatase from NL Chem Canada, Inc.), hydrated alumina (Hydrad TMC-HBF, Hydrad TM-HBC, available from J. M. Huber Corporation), barium sulfate (K.C. Blanc Fix HD80, available from Kall Chemie Corporation), calcium carbonate (Microwhite Sylacauga Calcium Products), high brightness clays (such as Engelhard Paper Clays), calcium silicate (available from J. M. Huber Corporation), cellulosic materials insoluble in water or any organic solvents (such as those available from Scientific Polymer Products), blends of calcium fluoride and silica, such as Opalex-C available from Kemira.O.Y, zinc oxide, such as Zoco Fax 183, available from Zo Chem, blends of zinc sulfide with barium sulfate, such as Lithopane, available from Schteben Company, and the like, as well as mixtures thereof.

Further, the coating of the recording sheets of the present invention can contain optional antistatic components. Antistatic components can be present In any effective amount, and if present, typically are present in amounts of from about 0.5 to about 5.0 percent by weight of the coating composition. Examples of antistatic components include both anionic and cationic materials. Examples of anionic antistatic components include monoester sulfosuccinates, such as those of the general formula

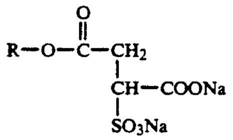

wherein R represents an alkanolamide or ethoxylated alcohol, diester sulfosuccinates, such as those of the general formula

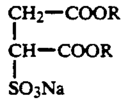

wherein R represents an alkyl group, and sulfosuccinamates, such as those of the general formula

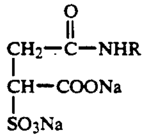

where R represents an alkyl group, all commercially available from Alkaril Chemicals as, for example, Alkasurf SS-L7DE, Alkasurf SS-L-HE, Alkasurf SS-OA-HE, Alkasurf SS-L9ME, Alkasurf SS-DA4-HE, Alkasurf SS-1B-45, Alkasurf SS-MA-80, Alkasurf SS-NO, Alkasurf SS-0-40, alkasurf SS-0-60PG, Alkasurf SS-0-70PG, Alkasurf SS-0-75, Alkasurf SS-TA, and the like. Examples of cationic antistatic components include diamino alkanes, such as those available from Aldrich Chemicals, quaternary salts, such as Cordex AT-172 and other materials available from Finetex Corp., and the like. Additional examples of materials suitable as antistatic components include those disclosed in copending application U.S. Ser. No. 08/034,917, (entitled "Recording Sheets Containing Phosphonium Compounds," with the named inventors Shadi L. Malhotra, Brent S. Bryant, and Doris K. Weiss), filed concurrently herewith, copending application U.S. Ser. No. 08/034,943, (entitled "Recording Sheets Containing Cationic Sulfur Compounds," with the named inventors Shadi L. Malhotra and Brent S. Bryant), filed concurrently herewith, copending application U.S. Ser. No. 08/033,917, (entitled "Recording Sheets Containing Pyridinium Compounds," with the named inventors Shadi L. Malhotra and Brent S. Bryant), filed concurrently herewith, copending application U.S. Ser. No. 08/034,445, (entitled "Recording Sheets Containing Monoammonium Compounds," with the named inventors Shadi L. Malhotra, Brent S. Bryant, and Doris K. Weiss), filed concurrently herewith, and copending application U.S. Ser. No. 08/033,918, (entitled "Recording Sheets Containing Tetrazolium, Indolinium, and Imidazolinium Compounds," with the named inventors Shadi L. Malhotra, Brent S. Bryant, and Doris K. Weiss), filed concurrently herewith, the disclosures of each of which are totally incorporated herein by reference.

The coating composition of the present invention can be applied to the substrate by any suitable technique. For example, the layer coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll Is stationary or is rotating slowly in the direction opposite to that of the applicator roll. In slot extrusion coating, a flat die is used to apply coating material (which generally is dissolved in a solvent) with the die lips in close proximity to the web of material to be coated. Once the desired amount of coating has been applied to the web, the coating is dried, typically at from about 25 to about 100° C. in an air drier.

Recording sheets of the present invention can be employed in printing and copying processes wherein dry or liquid electrophotographic-type developers are employed, such as electrophotographic processes, lonographic processes, or the like- Yet another embodiment of the present invention is directed to a process for generating images which comprises generating an electrostatic latent image on an imaging member in an imaging apparatus; developing the latent image with a toner; transferring the developed image to a recording sheet of the present invention; and optionally permanently affixing the transferred image to the recording sheet. Still another embodiment of the present invention is directed to an imaging process which comprises generating an electrostatic latent image on a recording sheet of the present invention; developing the latent image with a toner; and optionally permanently affixing the developed image to the recording sheet. Electrophotographic processes are well known, as described in, for example, U.S. Pat. No. 2,297,691 to Chester Carlson. Ionographic and electrographic processes are also well known, and are described in, for example, U.S. Pat. No. 3,564,556, U.S. Pat. No. 3,611,419, U.S. Pat. No. 4,240,084, U.S. Pat. No. 4 569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally "incorporated herein by reference.

The recording sheets of the present invention can also be used in any other printing or imaging process, such as printing with pen plotters, handwriting with ink pens, offset printing processes, or the like, provided that the ink employed to form the image is compatible with the ink receiving layer of the recording sheet.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ten transparency sheets were prepared by the dip coating process (both sides coated in one operation) by providing Mylar® sheets (8.5×11 inches) in a thickness of 100 microns and coating them with a blend of a binder resin, an additive, 1 percent by weight of Cordex AT-172 (antistatic agent, obtained from Finetex Corp.), and 1 percent by weight of colloidal silica (traction agent, Sylold 74, obtained from W. R. Grace & Co.). The coating composition was present in a concentration of 5 percent by weight in toluene. The coated Mylar® sheets were then dried in a vacuum hood for one hour. Measuring the difference in weight prior to and subsequent to coating these sheets indicated an average coating weight of about 300 milligrams on each side in a thickness of about 3 microns. These sheets were fed into a Xerox® 1038 copier and black images were obtained with optical densities of about 1.3. The images could not be lifted off with Scotch tape (3M). The optical densities of the images before and after the tape test were as follows:

| | | Black | | |
|---|---|---|---|---|
| Coating Composition | Substrate | Before | After | % TF |
| Styrene-butadiene copolymer XP-808 (styrene content ~85%) 89 percent by weight and dibromododecane. (Aldrich 25478-9) 9 percent by weight in toluene solution of 5 percent by weight. | Mylar | 1.3 | 1.3 | 100 |
| Styrene-nbutylmethacrylate copolymer XP-707 (styrene content ~85%) 89 percent and methyl eicosonoate (Aldrich 25,220-0) 9 percent by weight in toluene solution of 5 percent by weight | Mylar | 1.3 | 1.3 | 100 |
| Polystyrene (Scientific Polymer Products) 89 percent by weight and tetra cosane (Aldrich T875-2) 9 percent by weight in toluene solution of 5 percent by weight. | Mylar | 1.25 | 1.25 | 100 |
| Untreated | 4024 paper | 1.25 | 0.87 | 70 |
| Dodecanophenone in isopropanol (Aldrich 2527-9) 2% by weight | 4024 paper | 1.25 | 1.15 | 92 |
| Docosane in toluene 2% by weight (Aldrich 13,445-7) | 4024 paper | 1.3 | 1.2 | 92 |

As the results indicate, the recording sheets coated with the binder/additive component mixture exhibited significantly improved fix of the toner image to the sheet compared to the recording sheet not coated with a binder/additive component mixture according to the present invention.

EXAMPLE II

Plain paper sheets (Simpson alkaline sized, carrying no surface treatments, obtained from Simpson Paper Co., Kalamazoo, Mich.) measuring 8.5×11 inches were treated with solutions comprising 2 percent by weight of a material identified in the Table below and 98 percent of a solvent (specifically identified for each compound in the table below; ratios are by weight) via dip coating and dried in air at 100° C. Subsequent to treatment, each paper sheet had deposited on each side thereof about 100 milligrams of the material indicated in the Table. The treated papers as well as sheets of the Simpson paper which had not been treated were then incorporated into a Xerox® 4020 ink jet printer, and full color prints were generated on each sheet by the printer. The optical density of the black cyan, magenta, and yellow images were measured. Subsequently, the images were tested for water resistance by washing them at 500° C. for 2 minutes with water followed by again measuring the optical densities of the images. The results were as follows:

| | Black | | | Cyan | | | Magenta | | | Yellow | | |
|---|---|---|---|---|---|---|---|---|---|---|---|---|
| No | Bef. | Aft. | % WF | Bef. | Aft. | % WF | Bef. | Aft. | % WF | Bef. | Aft. | % WF |
| 0 | 1.11 | 0.74 | 67 | 0.97 | 0.72 | 74 | 1.01 | 0.48 | 48 | 0.75 | 0.62 | 83 |
| 1 | 1.09 | 1.11 | 102 | 0.96 | 1.02 | 106 | 0.88 | 0.55 | 63 | 0.69 | 0.63 | 91 |
| 2 | 1.19 | 1.07 | 90 | 1.03 | 0.95 | 92 | 0.97 | 0.61 | 63 | 0.76 | 0.72 | 95 |
| 3 | 1.23 | 1.03 | 84 | 1.01 | 0.89 | 88 | 0.90 | 0.61 | 68 | 0.69 | 0.64 | 93 |
| 4 | 1.21 | 0.94 | 78 | 1.01 | 0.91 | 90 | 0.94 | 0.58 | 62 | 0.72 | 0.60 | 83 |

| No | Treatment Material |
|---|---|
| 0 | untreated Simpson Paper |
| 1 | tridecyl amine (Aldrich T5,800-9) in isopropanol |
| 2 | 1,8-diamino octane (Aldrich D2,240-1) in water |
| 3 | Eladic acid (Aldrich E30-4) in isopropanol |
| 4 | Tridecanoic acid (Aldrich T5,760-6) in isopropanol |

As the data indicate, the recording sheets coated with the binder/additive component mixture exhibited significantly improved waterfastness of the ink jet image to the sheet compared to the recording sheet not coated with a binder/additive component mixture according to the present invention.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet consisting essentially of (a) a substrate; (b) a coating on the substrate which consists essentially of a binder and a material having a melting point of less than about 65° C. and a boiling point of greater than 150° C. and selected from the group consisting of alkyl phenones of the formula $C_6H_5CO(CH_2)_nCH_3$, wherein n is a number of from about 5 to about 16, alkyl ketones, halogenated alkanes, alkyl amines, alkyl anilines, alkyl diamines, alkyl alcohols, alkyl diols, halogenated alkyl alcohols, alkane alkyl esters, saturated fatty acids, unsaturated fatty acids, alkyl aldehydes, alkyl anhydrides, alkanes, and mixtures thereof; (c) an optional filler; and (d) an optional antistatic agent.

2. A recording sheet according to claim 1 wherein the material with a melting point of less than about 65° C. and a boiling point greater than 150° C. is selected from the group consisting of alkyl phenones of the formula $C_6H_5CO(CH_2)_nCH_3$, wherein n is a number of from about 5 to about 16, and mixtures thereof.

3. A recording sheet according to claim 2 wherein the material with a melting point of less than about 65° C. and a boiling point of greater than 150° C. is selected from the group consisting of octanophenone, decanophenone, dodecanophenone, tetradecanophenone, hexadecanophenone, octadecanophenone, and mixtures thereof.

4. A recording sheet according to claim 1 wherein the material with a melting point of less than about 65° C. and a boiling point of greater than 150° C. is selected from the group consisting of alkyl ketones of the formula $CH_3(CH_2)_mCO(CH_2)_nCH_3$, wherein m and n are each numbers of from about 4 to about 8, and mixtures thereof.

5. A recording sheet according to claim 4 wherein the material with a melting point of less than about 65° C. and a boiling point of greater than 150° C. is selected from the group consisting of 6-undecanone, 8-pentadecanone, 9-heptadecanone, 10-nonadecanone, and mixtures thereof.

6. A recording sheet according to claim 1 wherein the material with a melting point of less than about 65° C. and a boiling point of greater than 150° C. is selected from the group consisting of monohalogenated alkanes of the formula $CH_3(CH_2)_nX$, wherein X is a halogen atom and n is a number of from about 15 to about 25, dihalogenated alkanes of the formula $X(CH_2)_nX$, wherein X is a halogen atom and n is a number of from about 6 to about 15, and mixtures thereof.

7. A recording sheet according to claim 6 wherein the material with a melting point of less than about 65° C. and a boiling point of greater than 150° C. is selected from the group consisting of 1-bromooctadecane, 1-bromodocosane, 1,6-dibromohexane, 1,7-dibromoheptane, 1,8-dibromooctane, 1,10-dibromodecane, 1,10-dichlorodecane, 1,12-dibromododecane, 1,12-dibromododecane, and mixtures thereof.

8. A recording sheet according to claim 1 wherein the material with a melting point of less than about 75° C. and a boiling point of greater than 150° C. is selected from the group consisting of alkyl amines of the formula $CH_3(CH_2)_nNH_2$, wherein n is a number of from about 6 to about 20, and mixtures thereof.

9. A recording sheet according to claim 8 wherein the material with a melting point of less than about 65° C. and a boiling point of greater than 150° C. is selected from the group consisting of heptyl amine, octyl amine, decyl amine, undecyl amine, dodecyl amine, tridecyl amine, tetradecylamine, hexadecyl amine, octadecyl amine, and mixtures thereof.

10. A recording sheet according to claim 1 wherein the material with a melting point of less than about 65° C. and a boiling point of greater than 150° C. is selected from the group consisting of alkyl anilines of the formula $CH_3(CH_2)_nC_6H_4NH_2$, wherein n is a number of from about 6 to about 20, and mixtures thereof.

11. A recording sheet according to claim 10 wherein the material with a melting point of less than about 65° C. and a boiling point of greater than 150° C. is selected from the group consisting of heptyl aniline, octyl aniline, 4-decyl aniline, 4-tetradecyl aniline, hexadecyl aniline, and mixtures thereof.

12. A recording sheet according to claim 1 wherein the material with a melting point of less than about 65° C. and a boiling point of greater than 150° C. is selected from the group consisting of alkyl diamines of the formula $NH_2(CH_2)_nNH_2$, wherein n is a number of from about 6 to about 10, and mixtures thereof.

13. A recording sheet according to claim 12 wherein the material with a melting point of less than about 65° C. and a boiling point of greater than 150° C. is selected from the group consisting of 1,6-diaminohexane, 1,8-diaminooctane, 1,9-diaminononane, 1,10-diaminododecane, and mixtures thereof.

14. A recording sheet according to claim 1 wherein the material with a melting point of less than about 65° C. and a boiling point of greater than 150° C. is selected from the group consisting of alkyl alcohols of the formula $CH_3(CH_2)_nOH$, wherein n is a number of from about 5 to about 21, and mixtures thereof.

15. A recording sheet according to claim 14 wherein the material with a melting point of less than about 65° C. and a boiling point of greater than 150° C. is selected from the group consisting of hexyl alcohol, heptyl alcohol, octyl alcohol, nonyl alcohol, decyl alcohol, undecyl alcohol, 1-dodecanol, 1-tetradeconal, 1-pentadecanol, 1-hexadecanol, 1-eicosanol, 1-docosanol, and mixtures thereof.

16. A recording sheet according to claim 1 wherein the material with a melting point of less than about 65° C. and a boiling point of greater than 150° C. is selected from the group consisting of alkyl diols of the formula $OH(CH_2)_nOH$, wherein n is a number of from about 5 to about 9, alkyl diols of the formula $CH_3(CH_2)_nCHOH$ $CH_2OH$, wherein n is a number of from about 5 to about 9, and mixtures thereof.

17. A recording sheet according to claim 16 wherein the material with a melting point of less than about 65° C. and a boiling point of greater than 150° C. is selected from the group consisting of 1,5-pentane diol, 1,6-hexane diol, 1,7-heptane diol, 1,8-octane diol, 1,9-nonane diol, 1,2-octane diol, 1,2-decane diol, 1,2-tetradecane diol, and mixtures thereof.

18. A recording sheet according to claim 1 wherein the material with a melting point of less than about 65° C. and a boiling point of greater than 150° C. is selected from the group consisting of halogenated alkyl alcohols of the formula $X(CH_2)_nOH$, wherein X is a halogen atom and n is a number of from about 7 to about 14, and mixtures thereof.

19. A recording sheet according to claim 18 wherein the material with a melting point of less than about 65° C. and a boiling point of greater than 150° C. is selected from the group consisting of 11-bromo-1-undecanol, 12-bromo-1-dodecanol, and mixtures thereof.

20. A recording sheet according to claim 1 wherein the material with a melting point of less than about 65° C. and a boiling point of greater than 150° C. is selected from the group consisting of alkyl esters of the formula $CH_3(CH_2)_nCOOCH_3$, wherein n is a number of from about 5 to about 23, alkyl esters of the formula $CH_3(CH_2)_nCOOC_2H_5$, wherein n is a number of from about 4 to about 28, and mixtures thereof.

21. A recording sheet according to claim 20 wherein the material with a melting point of less than about 65° C. and a boiling point of greater than 150° C. is selected from the group consisting of methyl heptanoate, methyl nonanoate, methyl decanoate, methyl dodecanoate, methyl tridecanoate, methyl palmitate, methyl heptadecanoate, methyl stearate, methyl nonadecanoate, methyl eicosanoate, methyl heneicosanoate, methyl docosanoate, methyl tricosanoate, methyl tetracosanoate, ethyl hexanoate, ethyl octanoate, ethyl decanoate, ethyl tetradecanoate, ethyl palmitate, ethyl stearate, ethyl triacontanoate, and mixtures thereof.

22. A recording sheet according to claim 1 wherein the material with a melting point of less than about 65° C. and a boiling point of greater than 150° C. is selected from the group consisting of saturated fatty acids of the formula $CH_3(CH_2)_nCOOH$, wherein n is a number of from about 4 to about 16, and mixtures thereof.

23. A recording sheet according to claim 22 wherein the material with a melting point of less than about 65° C. and a boiling point of greater than 150° C. is selected from the group consisting of hexanoic acid, octanoic acid, nonanoic acid, decanoic acid, undecanoic acid, lauric acid, tridecanoic acid, myristic acid, pentadecanoic acid, palmitic acid, heptadecanoic acid, and mixtures thereof.

24. A recording sheet according to claim 1 wherein the material with a melting point of less than about 65° C. and a boiling point of greater than 150° C. is selected from the group consisting of unsaturated fatty acids of the formula $CH_3(CH_2)_7CH{=}CH(CH_2)_nCOOH$, wherein n is a number of from about 7 to about 13, and mixtures thereof.

25. A recording sheet according to claim 24 wherein the material with a melting point of less than about 65° C. and a boiling point of greater than 150° C. is selected from the group consisting of elaidic acid, erucic acid, nervonic acid, and mixture thereof.

26. A recording sheet according to claim 1 wherein the material with a melting point of less than about 65° C. and a boiling point of greater than 150° C. is selected from the group consisting of alkyl aldehydes of the formula $CH_3(CH_2)_nCHO$, wherein n is a number of from about 8 to about 14, and mixtures thereof.

27. A recording sheet according to claim 26 wherein the material with a melting point of less than about 65° C. and a boiling point of greater than 150° C. is tetradecyl aldehyde.

28. A recording sheet according to claim 1 wherein the material with a melting point of less than about 65° C. and a boiling point of greater than 150° C. is selected from the group consisting of alkyl anhydrides of the formula $(CH_3(CH_2)_nCO)_2O$, wherein n is a number of from about 8 to about 14, and mixtures thereof.

29. A recording sheet according to claim 28 wherein the material with a melting point of less than about 65° C. and a boiling point of greater than 150° C. is selected from the group consisting of lauric anhydride, palmitic anhydride, and mixtures thereof.

30. A recording sheet according to claim 1 wherein the material with a melting point of less than about 65° C. and a boiling point of greater than 150° C. is selected from the group consisting of alkanes of the formula $CH_3(CH_2)_nCH_3$, wherein n is a number of from about 8 to about 28, and mixtures thereof.

31. A recording sheet according to claim 30 wherein the material with a melting point of less than about 65° C. and a boiling point of greater than 150° C. is selected from the group consisting of decane, dodecane, heptadecane, octadecane, nonadecane, eicosane, heneicosane, docosane, tricosane, tetracosane, pentacosane, heptacosane, octacosane, tricontane, and mixtures thereof.

32. A recording sheet which comprises (a) a substrate; (b) a coating on the substrate which comprises a binder and a material having a melting point of less than about 65° C. and a boiling point of greater than 150° C. and selected from the group consisting of alkyl phenones of the formula $C_6H_5CO(CH_2)_nCH_3$, wherein n is a number of from about 5 to about 16, alkyl ketones, halogenated alkanes, alkyl amines, alkyl anilines, alkyl diamines, alkyl alcohols, alkyl diols, halogenated alkyl alcohols, alkyl aldehydes, alkyl anhydrides, alkanes, and mixtures thereof; (c) an optional filler; and (d) an optional antistatic agent.

* * * * *